(No Model.)
DE WITT C. JAMES.
UNDERGROUND ELECTRIC CONDUCTOR.
No. 375,633. Patented Dec. 27, 1887.
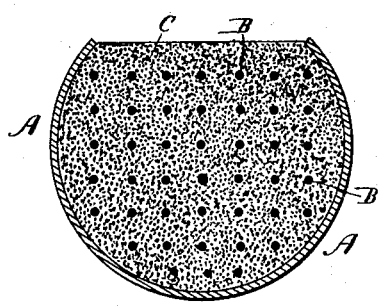
WITNESSES
INVENTOR
Attorney

UNITED STATES PATENT OFFICE.

DE WITT C. JAMES, OF WARREN, PENNSYLVANIA.

UNDERGROUND ELECTRIC CONDUCTOR.

SPECIFICATION forming part of Letters Patent No. 375,633, dated December 27, 1887.

Application filed March 29, 1887. Serial No. 232,904. (No model.)

*To all whom it may concern:*

Be it known that I, DE WITT C. JAMES, a citizen of the United States, residing at Warren, in the county of Warren and State of Pennsylvania, have invented certain new and useful Improvements in Underground Electric Conductors, of which the following is a specification, reference being had therein to the accompanying drawing.

This invention relates to certain improvements in underground electric conductors; and it has for its objects to provide a composition for incasing or inclosing such conductors, which will afford perfect insulation, will be sufficiently tough and elastic to support the inclosed wires without breaking when laid, and which may be conveniently laid in troughs of inexpensive material, as more fully hereinafter specified.

In the drawing is represented a cross-section of a conductor embodying my invention.

The letter A indicates a trough, which may be of any desired shape and dimensions and constructed of any suitable material, as it is only designed to form a mold in which the compound may be filled in for convenience in laying. Therefore it may be made of cheap destructible material—such as thin boards, pasteboard, or the like—which may be allowed to rot, as the composition, when laid, possesses the proper qualities to support and inclose the wires without cracking.

The letter C indicates the compound, and B the wires or conductors. The compound consists of a cement composed of three non-conducting substances, which possess otherwise, however, different characteristics, as more fully hereinafter explained. These ingredients are rosin, pulverized glass, and sulphur. The rosin, while a perfect non-conductor, is too brittle and fragile to form alone a support for the conductors. The pulverized glass by itself, it is evident, would not do so, while the sulphur could not be conveniently manipulated to lay the line, on account of its lacking the requisite fluidity to be poured when melted. By combining the three substances, however, a cement having qualities resembling stone and the requisite toughness to support the wires is obtained. The proportions of the ingredients may be varied indefinitely without departing from the spirit of my invention; but for general purposes I prefer to employ them in equal parts, by bulk.

In preparing the compound or cement the rosin is first melted in a suitable vessel, and when perfectly fluid the sulphur is added and the heat continued until the sulphur has melted and combined with the rosin. The pulverized glass is then added, and the whole is still further stirred until a fluid mass of proper consistency is obtained.

In laying the conduit the trough is first properly laid in trenches in the ground with the opening upward. The wires are then stretched in the trough in any suitable manner that will keep them away from each other. The compound in a heated and fluid state is then poured in, filling the trough and securely inclosing the wires. The conductor, of course, is laid in sections for convenience.

When it is desired to tap the conductor so as to connect all or any particular wire with a way station, the outer casing or trough is bored or cut away at a suitable point and the cement is melted at such point so as to expose the desired wire or wires, to which suitable branch wires are attached leading to such station. Additional line-wires may be laid from time to time, if desired, by opening the trench, stretching such wires, and filling in with extra cement or compound.

It will be seen that by combining the ingredients I obtain a compound having the combined virtues of the three and none of their defects, thus obtaining a conductor of superior qualities.

Having thus described my invention, what I claim, and desire to secure by Letters Patent, is—

1. A compound for underground electrical conductors, consisting of rosin, pulverized glass, and sulphur melted and combined to form a homogeneous mass, substantially as specified.

2. An electrical conductor consisting of a series of wires stretched in an underground trench and inclosed in a supporting compound composed of rosin, pulverized glass, and sulphur, substantially as specified.

In testimony whereof I affix my signature in presence of two witnesses.

DE WITT C. JAMES.

Witnesses:
C. M. ALEXANDER,
CHAS. D. DAVIS.